US010722966B2

(12) United States Patent
Atin et al.

(10) Patent No.: US 10,722,966 B2
(45) Date of Patent: Jul. 28, 2020

(54) SUPPORT RING AND FABRICATION METHOD FOR SUBSEA PIPELINES

(71) Applicant: Acergy France SAS, Suresnes (FR)

(72) Inventors: Cesar Atin, Nanterre (FR); Jacques Lacome, Sucy en Brie (FR)

(73) Assignee: Acergy France SAS, Suresnes (FR)

( * ) Notice: Subject to any disclaimer, the term of this patent is extended or adjusted under 35 U.S.C. 154(b) by 74 days.

(21) Appl. No.: 16/068,093

(22) PCT Filed: Jan. 5, 2017

(86) PCT No.: PCT/IB2017/000068
§ 371 (c)(1),
(2) Date: Jul. 3, 2018

(87) PCT Pub. No.: WO2017/118912
PCT Pub. Date: Jul. 13, 2017

(65) Prior Publication Data
US 2019/0009354 A1    Jan. 10, 2019

(30) Foreign Application Priority Data
Jan. 5, 2016 (GB) .................................. 1600156.2

(51) Int. Cl.
*B23K 9/028*   (2006.01)
*B23K 37/02*   (2006.01)
(Continued)

(52) U.S. Cl.
CPC ........ *B23K 9/0286* (2013.01); *B23K 37/0211* (2013.01); *B23K 37/0217* (2013.01);
(Continued)

(58) Field of Classification Search
None
See application file for complete search history.

(56) References Cited

U.S. PATENT DOCUMENTS 3,860,785 A * 1/1975 Wittman .............. B23K 9/0282
219/136
3,910,480 A 10/1975 Thatcher
(Continued)

FOREIGN PATENT DOCUMENTS

EP    2 007 541    10/2007
JP    55-128381    10/1980
(Continued)

*Primary Examiner* — Ibrahime A Abraham
*Assistant Examiner* — Elizabeth M Sims
(74) *Attorney, Agent, or Firm* — Levy & Grandinetti

(57) ABSTRACT

A support ring supports a welding ring to guide welding bugs around a coated pipe section. The support ring has a tubular body to support the welding ring, the body having substantially circular curvature around a longitudinal axis. At least one grounding extension connected to the body is offset longitudinally and radially outwardly with respect to the body and the longitudinal axis. This allows the grounding extension to lie radially outboard of a parent coating of the pipe section while the body encircles a cut-back end zone where the parent coating has been cut back. Pipe sections abutting end-to-end for welding can each be fitted with these support rings. This enables welding rings to encircle both of the cut-back end zones and allows effective grounding connections to be made without enlarging the cut-back end zones.

14 Claims, 7 Drawing Sheets

(51) Int. Cl.
*B23K 101/10* (2006.01)
*H01R 4/64* (2006.01)

(52) U.S. Cl.
CPC ...... *B23K 37/0258* (2013.01); *B23K 37/0276* (2013.01); *B23K 2101/10* (2018.08); *H01R 4/643* (2013.01)

(56) References Cited

U.S. PATENT DOCUMENTS

| | | | |
|---|---|---|---|
| 4,331,278 | A | 5/1982 | Sherer et al. |
| 5,944,248 | A | 8/1999 | Van Heuveln |
| 8,642,914 | B2 * | 2/2014 | Dupont ................ B23K 9/0286 219/59.1 |
| 2010/0006627 | A1 * | 1/2010 | Bonelli ................ B23K 9/0286 228/212 |
| 2014/0259597 | A1 * | 9/2014 | Lavalley ................ B21D 19/10 29/407.1 |

FOREIGN PATENT DOCUMENTS

| | | |
|---|---|---|
| JP | 63-36972 | 2/1988 |
| KR | 2009-0016296 | 2/2009 |
| NL | 9101780 | 6/1992 |
| WO | WO 2008/052632 | 5/2008 |
| WO | WO 2015/160583 | 10/2015 |

* cited by examiner

SUPPORT RING AND FABRICATION METHOD FOR SUBSEA PIPELINES

This invention relates to the fabrication of subsea pipelines or similar elongate hollow subsea structures by welding.

Pipelines used in the subsea oil and gas industry are most commonly formed of lengths of steel pipe welded together end-to-end. There is therefore a need in the industry to make circumferential girth or butt welds between successive pipe sections such as pipe joints or pipe stalks, which comprise many pipe joints previously welded together. Such welds may, for example, be made when fabricating pipelines offshore in S-lay or J-lay operations or when fabricating pipelines onshore at a spoolbase for subsequent reel-lay operations.

Where a pipeline is laid offshore in S-lay or J-lay operations, fabrication from pipe joints is performed aboard a pipelaying vessel such as a laybarge that launches the resulting pipe string into the sea. In the S-lay method, for example, a pipe string is assembled on the deck of the vessel in a horizontal firing line with multiple welding stations. After testing and coating the welds at further stations downstream on the firing line, the pipe string is launched from the vessel over a stinger to curve down through the water to the sea bed.

Referring in this respect to the schematic view of FIG. 1 of the drawings, a pipelaying vessel 10 configured for the S-lay installation method moves from left to right as illustrated during a pipelaying operation. The vessel 10 carries a supply of pipe joints 12 on its deck 14 that are welded together at one or more welding stations 16 to form a pipe string 18 that moves aft with respect to the vessel 10 along a firing line. The welds are tested at one or more testing stations 20 located downstream (i.e. aft) of the welding stations 16 and are then coated at one or more coating stations 22 located downstream of the testing stations 20. The welding stations 16, testing stations 20 and coating stations 22 thus lie on the firing line along which the pipe string 18 moves as it is assembled, checked and coated before being launched from the vessel 10 into the sea 24.

The pipe string 18 is supported by a tensioner system 26 located downstream of the coating stations 22. The pipe string 18 is launched from the vessel 10 over a stinger 28 extending aft of the vessel 10, located downstream of the tensioner system 26. The stinger 28 comprises rollers 30 that support the overbend of the pipe string 18 as it enters the sea 24. The pipe string 18 hangs from the stinger 28 in a shallow S-shape under tension acting between the tensioner system 26 and a touchdown point on the seabed (not shown).

It is desirable to perform pipelaying as quickly as safety allows. This minimises the operating cost of the vessel and reduces tie-up of valuable capital equipment. It also shortens the 'weather window' of favourable sea conditions that may be necessary to complete a pipelaying task.

The speed of pipelaying depends upon minimising the timescale of all operations on the critical path. Given the stepwise, sequential processing steps of welding, testing and coating in S-lay operations, it is particularly important that welding takes no longer than is necessary. Otherwise there will be a bottleneck in the pipeline fabrication and installation process.

To mitigate corrosion of a pipeline and optionally also to reduce heat transfer from or to the fluids that the pipeline carries in use, pipe sections are pre-coated with protective parent coatings that, optionally, are also thermally insulating. Commonly a thin inner layer of anti-corrosion primer, fusion-bonded epoxy (FBE) or adhesive applied directly to the outer metal surface of the pipe is surrounded by a thicker outer layer of protective or insulating material, which may for example be of polypropylene (PP) and may itself have a layered structure. It is also known to apply a concrete weight coating (CWC) as an outer layer around an inner layer of FBE, to confer negative buoyancy on a pipeline and to provide mechanical protection.

A short length of the underlying pipe must be left uncoated at an end of a pipe section to facilitate butt welding. Thus, preparatory work on a pipe section before welding typically involves cutting some of the parent coating away from the end of the underlying pipe to form a cut-back zone that extends proximally from the protruding distal end of the pipe. The length of the cut-back zone may be determined to some extent by thermal constraints, in particular to avoid melting or otherwise degrading the parent coating due to the heat of welding.

The cut edge of the parent coating may be chamfered to form a frusto-conical shape or may be cut straight to lie in a radial plane that is orthogonal to the central longitudinal axis of the pipeline. Either way, the result is that a cut distal edge of the parent coating is stepped back proximally from the adjacent distal end of the underlying pipe.

In practice, where a parent coating comprises an inner layer within an outer layer, the cutting-back operation may leave two distinct steps in the edge of the coating. First, the outer layer, which may be of plastics or concrete, is cut back in the proximal direction to expose the inner layer, which may be of FBE or adhesive. The exposed inner layer is removed from the immediate environs of the weld by being ground or machined away to expose a narrow circumferential band of bare metal extending proximally from the distal end of the underlying pipe.

Consequently, the cut-back zone extending from the distal end of the underlying pipe to the cut edge of the parent coating comprises a circumferential band of bare metal on the distal side of an adjoining circumferential band of the exposed inner layer. The distal edge of the exposed inner layer forms a first, shallow step in the edge of the parent coating. As the inner layer protrudes distally beyond the cut edge of the outer layer, the latter forms a second, larger step in the edge of the parent coating, disposed proximally with respect to the first step.

At a welding station, two pipe sections to be joined are lined up end-to-end after their parent coatings have been cut back. A welding ring is secured around the cut-back zone of one of the pipe sections and a grounding wire is attached to the opposed cut-back zone of the other pipe section to connect the pipe sections to earth. Welding bugs are coupled to the welding ring to perform welding automatically, preferably by electric arc welding, as they move along the ring around the joint where the pipe sections abut. U.S. Pat. No. 3,718,798 describes a typical welding bug.

After the weld has been completed, non-destructive testing (NDT) such as radiography or ultrasonic testing must be performed on the weld to detect any defects. Finally, after passing NDT, the uncoated region of the pipe around the welded joint is coated with a field joint coating to mitigate corrosion and to maintain whatever level of thermal insulation or mechanical protection is deemed necessary for the purposes of the pipeline. In S-lay operations, field joint coating is carried out upstream of the stinger, at one or more coating stations to which the pipe string is advanced in stepwise fashion after welding. When the field joint coating has been applied and has cured or otherwise solidified, the conjoined pipe sections are ready for launching into the sea as part of a subsea pipeline.

The material used for field joint coating suitably complements the material of the parent coatings. For example, a field joint coating between parent coatings of PP may be made by injection-moulding PP into the gap between the facing edges of the parent coatings.

A welding ring is a metal band or circumferentially-extending track that is assembled on the cut-back zone around one of the adjoining pipe ends, close to the joint to be welded. An example of a welding ring is disclosed in U.S. Pat. Nos. 3,910,480; 5,944,248 discloses an improvement to cope with positioning issues.

JPS 55128381 and JPS 6336972 show examples of supporting 'guide' rings provided on the outer periphery of pipe. A rotary ring with welding components attached is mounted to the guide ring in each case.

Conventionally, two welding bugs are used simultaneously on the same welding ring to speed up the welding process. The bugs are angularly spaced from each other in the circumferential direction of the ring, about the central longitudinal axis of the pipeline.

Persons unfamiliar with the industry may think that it would be simple to speed up the welding process by mounting more welding bugs on a welding ring. However, in practice, it is not possible to use more than two bugs on a welding ring because of the risk of deforming the ring. Further, it may not be possible simply to enlarge the welding ring to make it stronger because the thickness of the welding ring is limited by the axial length of the cut-back zone.

To illustrate this point, KR 100889585 discloses a large clamped welding ring but such a large ring is not always practical in practice. In this respect, a correspondingly long cut-back zone increases the quantity of material that must be used when applying a field joint coating to fill the resulting gap between the facing edges of the parent coatings. This disadvantageously increases the cycle time for field joint coating, particularly for thermoplastics such as PP because a larger body of molten material will tend to take longer to cool and solidify. The result may be to place the field joint coating step onto the critical path in place of welding, and hence to lose any benefit of faster welding while waiting for the field joint coating step to be completed.

That being so, persons unfamiliar with the industry may think that it would be simple to add another welding ring, so that for example one ring is positioned on the cut-back zone of each abutting pipe end. However the need for the grounding wire to be firmly electrically connected to a cut-back zone of a pipe section precludes this alternative. In this respect, it must be noted that arc-welding methods performed on subsea pipelines require grounding wires to carry a very large current to initiate the necessary arc, which may be in the order of 1000 A.

Another challenge is to deal with cut-backs that, in practice, are not consistent in their dimensions: in particular, the axial length and the shape of the cut-back zone may vary. Additionally, the inner layer of the coating may not always be removed around the full circumference of the underlying pipe wall to expose bare metal.

A welding ring disclosed in WO 2007/110514 is made of two halves that are clamped together around the cut-back zone. This design is not vulnerable to minor variations in the cut-back geometry but it still requires separate grounding of the cut-back and the weld area for arc welding operations.

Against this background, the invention provides a support ring that can be mounted to a cut-back zone around an end of a pipe section, preferably before that pipe section has been advanced to a welding station on the firing line. The support ring of the invention is designed to facilitate mounting a welding ring, hence reducing positioning and connection time, and also to make a good electrical connection for one or more earthing wires. The support ring of the invention can also comply with cut-backs having different shapes and axial lengths, especially smaller cut-backs.

In one sense, the invention resides in a support ring for supporting a welding ring to encircle a pipe section, the support ring having:

a tubular body with substantially circular curvature around a longitudinal axis to support the welding ring; and at least one grounding extension connected to the body; wherein the grounding extension is offset longitudinally and radially outwardly along or with respect to the body and the longitudinal axis.

The or each grounding extension is arranged to be electrically connected to ground, and so suitably has ground connector provisions such as connector formations to which one or more earthing wires can be attached. In this way, the support ring of the invention provides a reliable grounding facility by exploiting space available on the radially outer side of a parent coating, longitudinally offset from the cut-back zone. This avoids impinging on the cut-back zone where the tubular body can instead be attached to the pipe to support a welding ring that encircles the pipe.

Thus, the invention frees both of the opposing cut-back zones of abutting pipe sections to carry support rings of the invention, so doubling the number of welding rings and hence welding bugs that can operate simultaneously on the weld. Importantly, the resulting step-change improvement in welding speed can be achieved without having to increase the size of the cut-backs to accommodate earthing wires or thicker welding rings. Minimising the size of the cut-backs avoids slowing the subsequent field joint coating operation, which could otherwise negate any advantage in welding speed.

A step suitably extends in a radially-outward direction between the body and the or each grounding extension to connect the extension to the body and to effect the radial offset of the extension with respect to the body. The step may be joined directly to the body, suitably at a longitudinal edge of the body, or may be joined to the body indirectly via a longitudinally-extending tab. Similarly, the step may be joined directly or indirectly to the grounding extension, preferably to a longitudinal edge of the extension.

The step between the body and the or each grounding extension may, for example, lie in a plane that is substantially orthogonal to the longitudinal axis around which the body is curved. Alternatively, the step could instead be inclined at an acute angle to that axis.

The or each grounding extension suitably extends only partially around the circumference of the tubular body and is preferably cantilevered from the body to extend longitudinally from the body away from the distal end of the pipe, optionally via the aforementioned step.

The body and the or each grounding extension are preferably rigidly connected, for example by being integral with each other, in addition to being electrically connected to each other. Conveniently, therefore, the body and the extension are parts of the same metal component. That component is apt to be fabricated by welding, although its parts could instead be bolted or otherwise joined together.

The tubular body suitably comprises at least two part-tubular part-rings each of part-circular section, for example two substantially half-tubular part-rings, to complete a substantially circular ring when brought together. In that case, connectors such as hinges, latches or fasteners may be provided for joining the part-rings around the pipe section. At least one of the part-rings will support at least one grounding extension.

Welding rings may be integrated with or removably attachable to the tubular body, and so may similarly comprise at least two part-tubular part-rings each of part-circular section.

The tubular body preferably has a stepped radially inner face, that face comprising a radially inner portion that is longitudinally offset from a radially outer portion with respect to the longitudinal axis. The radially outer portion is conveniently disposed between the radially inner portion and the grounding extension in the longitudinal direction. By matching the stepped profile in the cut-back zone between the bare metal of the pipe and the inner layer of the parent coating, this stepped inner face enables the radially inner portion to make a good contact over a wide area with the bare metal.

Advantageously, the radial offset of the or each grounding extension is sufficient to exceed the maximum thickness of a parent coating applied to the pipe section.

Any part of the support ring, such as a grounding extension, may include provisions for cooling. Such provisions may include water channels for water cooling.

The support ring of the invention may comprise or support a shield to protect an underlying pipe section from radiant heat or spattering from the weld. Conveniently, the shield may be provided or supported at the aforementioned step between the tubular body and the grounding extension.

The grounding extension may comprise a tubular or part-tubular plate whose curvature is suitably also substantially centred on the longitudinal axis.

The invention extends to a combination of the support ring of the invention fitted to a pipe section, wherein the tubular body encircles a cut-back end zone where a parent coating of the pipe section has been cut back, and the grounding extension lies radially outboard of the parent coating such that the coating lies between the grounding extension and the pipe that underlies the coating. Thus, the extension extends proximally relative to a distal edge of the parent coating. In such a combination, two pipe sections disposed end-to-end for butt welding may each be fitted with a respective support ring, the grounding extension of each support ring being connected to at least one grounding wire.

The inventive concept also embraces a related method of butt-welding pipe sections, the method comprising:

fitting a tubular body to at least one of the pipe sections around an end zone where a parent coating of the pipe section has been cut back, to support a welding ring encircling the cut-back end zone of the pipe section;

positioning at least one grounding formation or grounding extension radially outboard of the parent coating of the pipe section, the or each grounding formation or grounding extension being connected to the tubular body and offset longitudinally and radially outwardly along or with respect to the tubular body and a central longitudinal axis of the pipe section;

connecting at least one ground wire to the or each grounding formation or grounding extension; and supplying electric arc welding power to or otherwise powering at least two welding bugs on the welding ring with current flowing through the ground wire, to weld together the pipe sections.

When welding is complete, the welding bugs may be demounted from the welding ring, the welding ring may be removed from the tubular body and the tubular body may be removed from the pipe section.

Conveniently, the grounding formation may be positioned simultaneously with fitting the tubular body around the cut-back end zone, most conveniently by fitting a support ring to the pipe section that implements and hence rigidly connects both features.

The tubular body is preferably fitted around the cut-back end zone before lining-up the pipe sections end-to-end. The welding ring may be fitted to the tubular body before or after lining-up. The welding bugs may then be mounted on the welding ring.

It may be possible to integrate the welding ring with the tubular body, in which case fitting the tubular body to the pipe section and removing the tubular body from the pipe section will serve also to fit and remove the welding ring.

Advantageously, respective tubular bodies are fitted around the cut-back end zones of each of two pipe sections. The tubular bodies may then support respective welding rings, each encircling one of the cut-back end zones. The cut-back end zones will adjoin when the pipe sections are lined up, whereupon the welding rings will lie parallel to each other in spaced longitudinal relation about the joint to be welded. One of the welding rings may have at least two welding bugs mounted on it; the other of the welding rings may have at least one welding bug mounted on it.

In summary, a support ring supports a welding ring to guide at least one welding bug around a pipe section. The support ring has a tubular body to support the welding ring, the body having substantially circular curvature around a longitudinal axis. At least one grounding extension connected to the body is offset longitudinally and radially outwardly along or with respect to the body and the longitudinal axis. This allows the grounding extension to lie radially outboard of a parent coating of the pipe section while the body encircles a cut-back end zone where the parent coating has been cut back.

Coated pipe sections abutting end-to-end for welding may each be fitted with similar support rings. This enables welding rings to encircle both of the cut-back end zones and allows effective grounding connections to be made without enlarging the cut-back end zones.

In order that the invention may be more readily understood, reference will now be made, by way of example, to the accompanying drawings in which.

Figure 1:
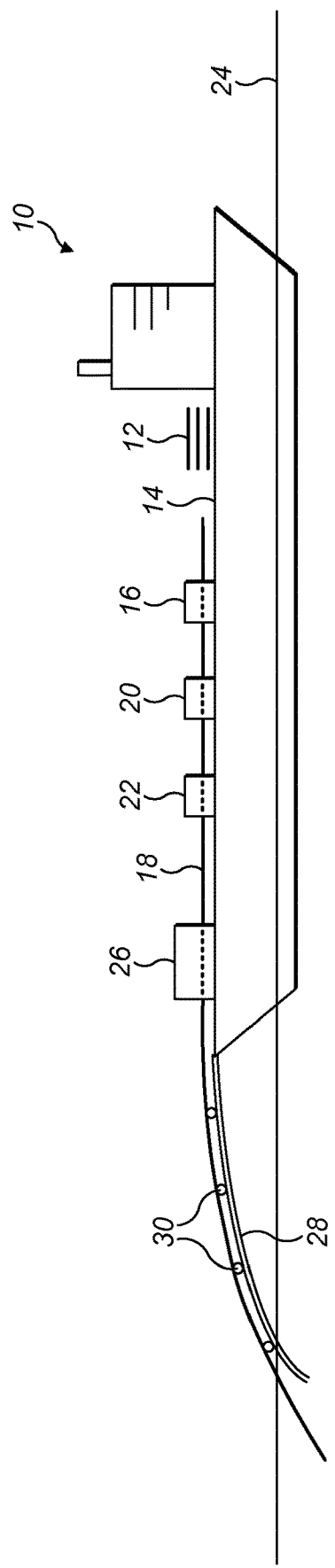
FIG. 1 is a schematic side view of a pipelaying vessel performing an S-lay operation as known in the prior art.
Figure 2:
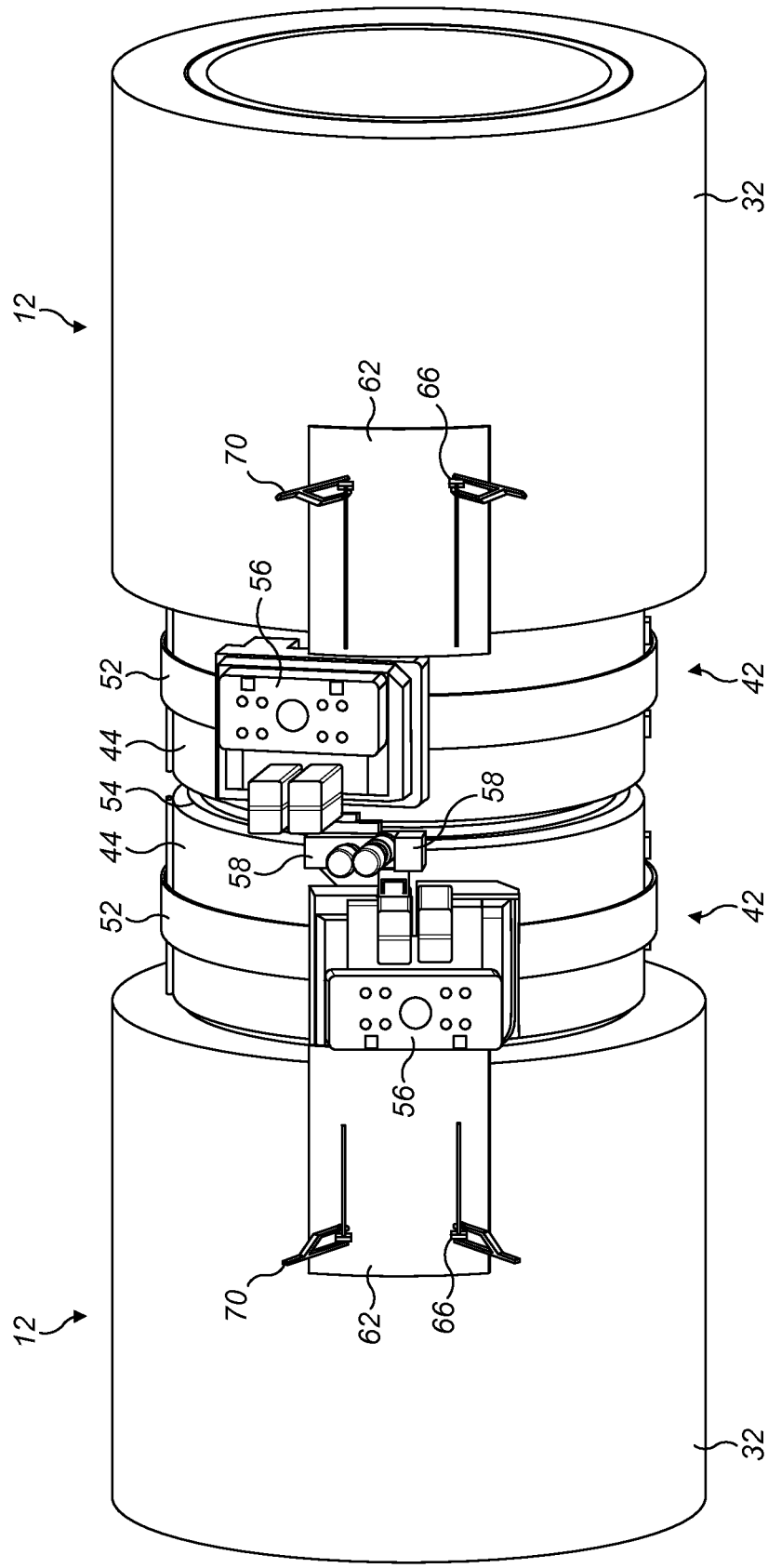
FIGS. 2 to 5 are perspective views of coated pipe joints being butt-welded end-to-end, each pipe joint being fitted with a support ring of the invention to support a respective welding ring mounted with welding bugs.
Figure 3:
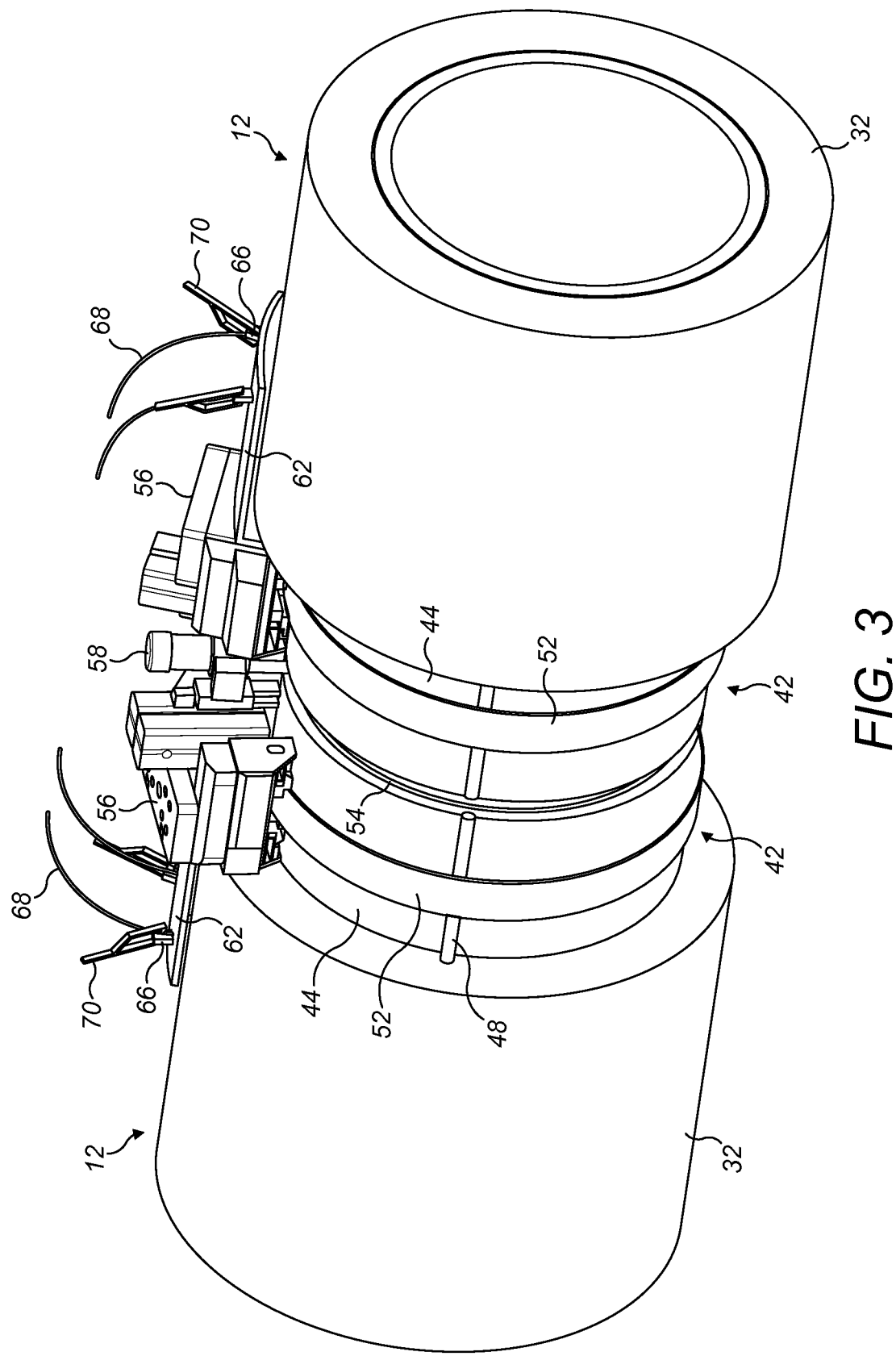
Figure 4:
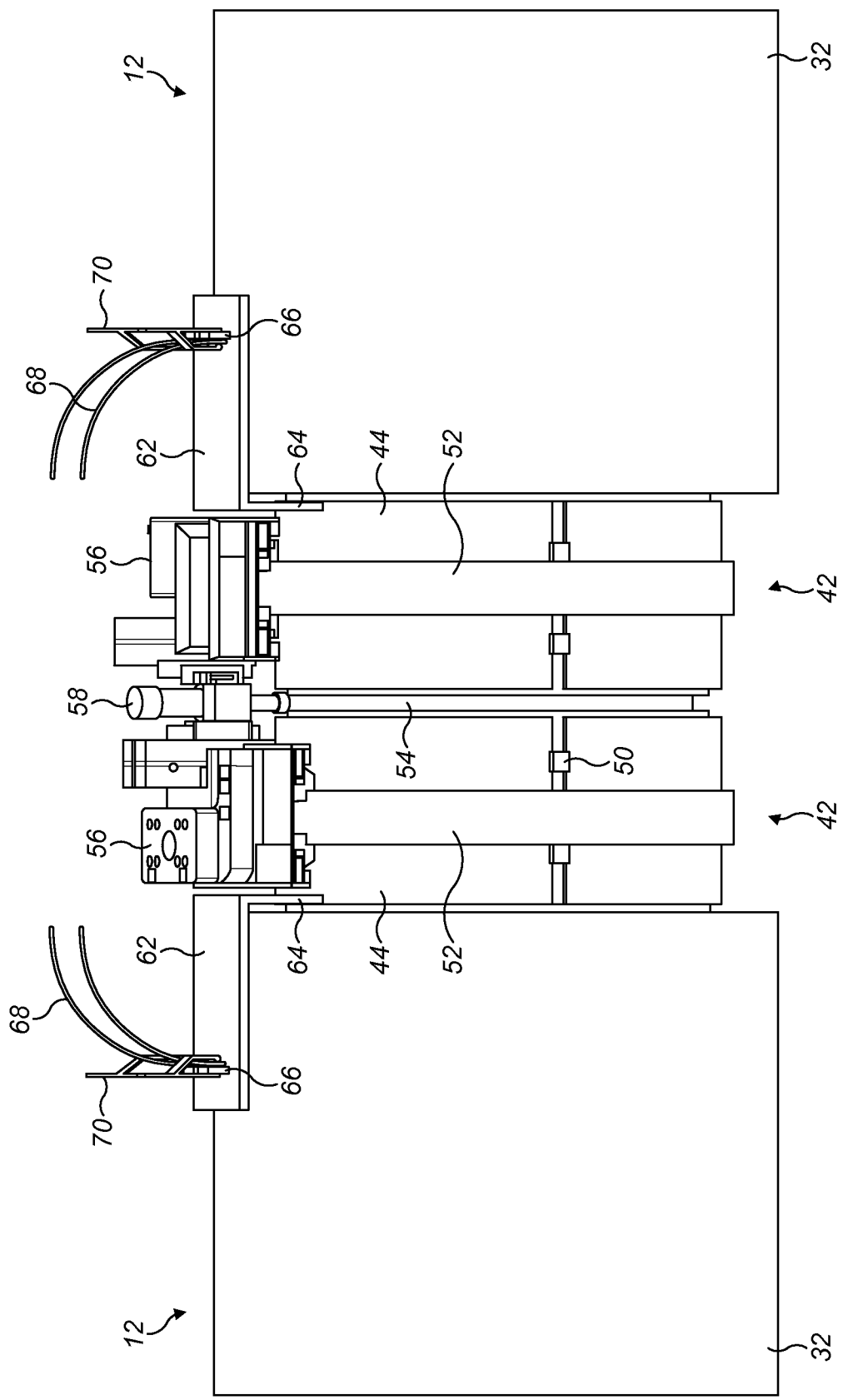
Figure 5:
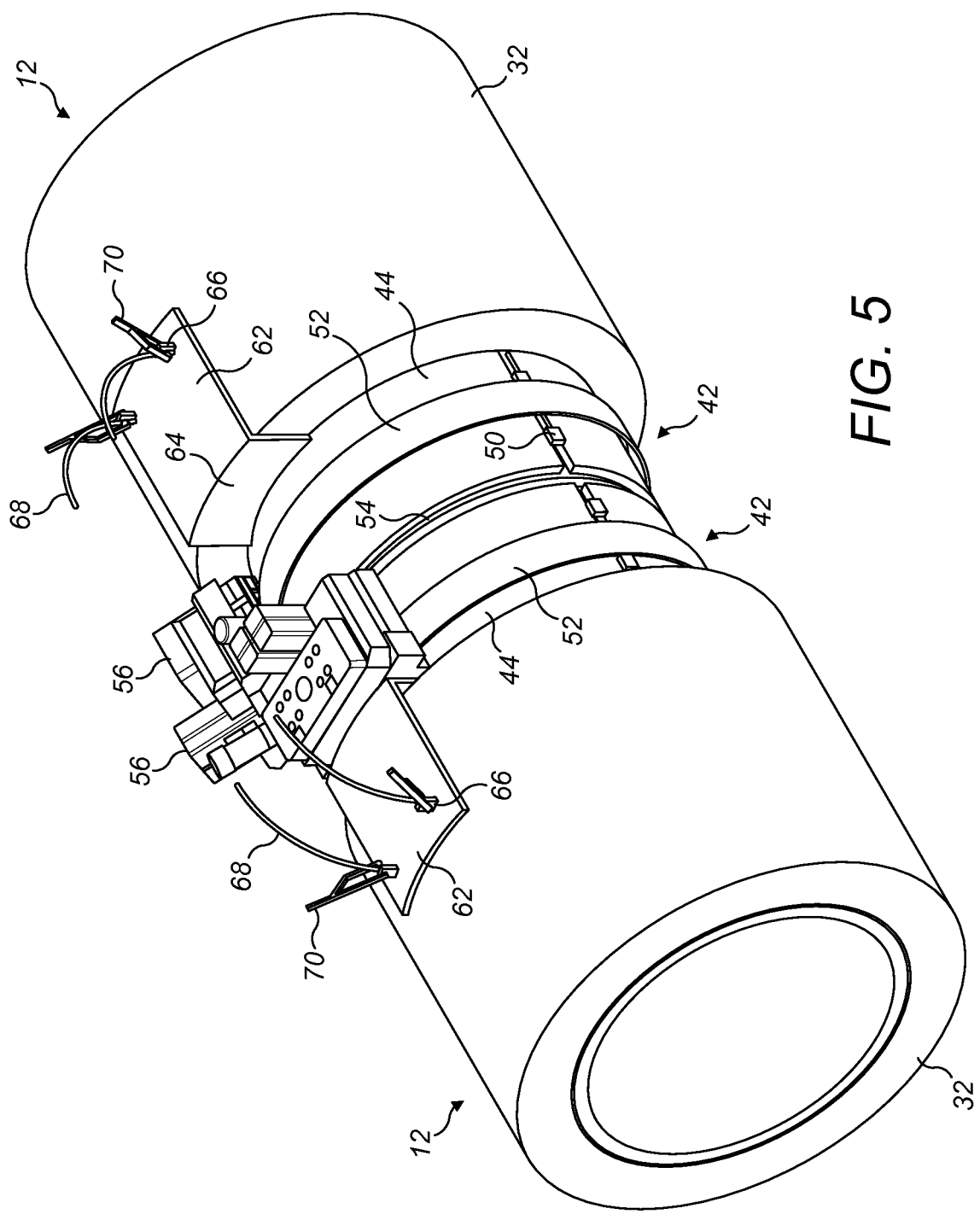

Reference has already been made to FIG. 1 to outline an S-lay operation. Whilst the invention has particular benefits in the context of an S-lay operation as illustrated in FIG. 1, it may also be used with benefit when fabricating subsea pipelines in other circumstances, such as on a J-lay vessel offshore or at a spoolbase onshore.

Turning now to FIGS. 2 to 6, like numerals are used for like features. These drawings show coated pipe joints 12 being butt-welded together end-to-end in accordance with the invention. This operation is apt to be performed at a welding station 16 on the firing line of a pipelaying vessel 10 as shown in FIG. 1. The welding operation is performed after preparatory steps such as cutting-back the parent coatings 32 and before subsequent steps such as weld testing and field joint coating. Those subsequent steps are typically performed at following stations 20, 22 on the firing line as also shown in FIG. 1.

Figure 6:
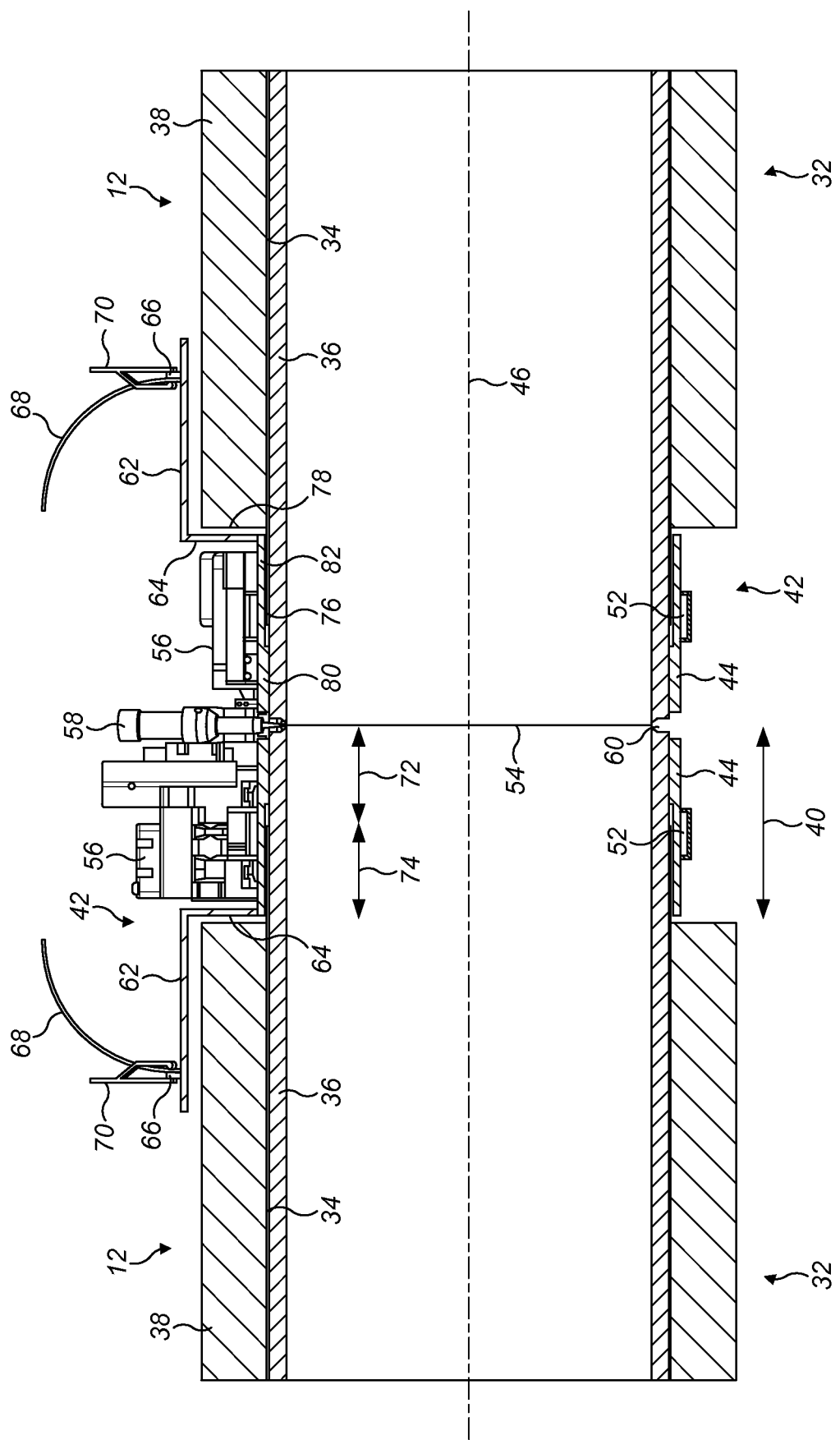
FIG. 6 is a side view in longitudinal section corresponding to FIG. 5.

FIG. 6 best shows that the parent coatings 32 of the pipe joints 12 each comprise a thin inner layer 34 of, for example, FBE applied directly to the outer metal surface of the underlying pipe 36, surrounded by a much thicker outer layer 38 of, for example, PP or concrete.

Short lengths of pipe 36 have been left uncoated at the adjoining ends of the pipe joints 12 by previously cutting away some of the parent coatings 32. The resulting cut-back zones 40 extend in opposed proximal directions away from the abutting distal ends of the pipe joints 12. Thus, the cut distal edges of the parent coatings 32 are stepped back proximally from the adjacent distal ends of the underlying pipes 36. Here, the cut edges of the outer layers 38 of the parent coatings 32 are cut straight but they could instead be chamfered.

Each pipe joint 12 is fitted with a metallic support ring 42 in accordance with the invention. For this purpose, each support ring 42 has a tubular body 44 that encircles and clamps around the cut-back zone 40 of a pipe joint 12. In this example, the tubular body 44 comprises two substantially half-tubular part-rings, each being of part-circular section with an axis of curvature that coincides with the common central longitudinal axis 46 of the pipe joints 12. The part-rings are joined on one side by hinges 48 shown in FIG. 3 and on the other side by latches or fasteners 50 shown in FIGS. 4 and 5 to complete a substantially circular ring when brought together around the pipe joints 12.

Welding rings 52 are attached to the respective tubular bodies 44 of the support rings 42 to encircle the cut-back zones 40 of the pipe joints 12. The welding rings 52 lie parallel to each other in spaced longitudinal relation about the joint 54 to be welded.

Bugs 56 mounted on the welding rings 52 are driven along the welding rings 52 and hence around the pipe joints 12. The bugs 56 move circumferentially around the pipe joints 12 so that welding heads 58 carried by the bugs 56 can run successive weld beads within a groove 60 at the joint 54 defined between the abutting ends of the pipe joints 12. Services including power, data connections, shielding gas and welding wire are fed continuously to the welding heads 58 during welding.

For ease of illustration, each welding ring 52 is shown supporting one bug 56. However, in practice, one of the welding rings 52 may support two bugs 56 and the other of the welding rings 52 may support at least one bug 56, but preferably two bugs 56.

Each support ring 42 further comprises a grounding extension 62 that is connected rigidly and integrally to the tubular body 44. The grounding extension 62 comprises a part-tubular plate whose curvature is also substantially centred on the central longitudinal axis 46. The plate extends partially around the circumference of the body 44 and is cantilevered from the proximal side of the body 44 to extend away from the distal end of the pipe joint 12.

A step 64 at a proximal longitudinal edge of the body 44 extends in a radially-outward direction between the body 44 and a distal longitudinal edge of the grounding extension 62 to connect the extension 62 to the body 44. In this example, the step 64 lies in a plane that is substantially orthogonal to the central longitudinal axis 46.

By virtue of the step 64, the grounding extension 62 is offset longitudinally and radially outwardly with respect to the body 44 and the central longitudinal axis 46. The radial offset exceeds the thickness of the parent coatings 32. This positions the grounding extension 62 radially outboard of the parent coating 32 of the pipe joint 12 and so avoids enlarging the cut-back zone 40 or impinging on the cut-back zone 40 of the other pipe joint 12.

The grounding extensions 62 of the support rings 42 each have connector formations 66 to which one or more earthing wires 68 can be attached by locking pliers 70.

FIG. 6 shows that the cut edges of the parent coatings 32 are stepped in this example. The cut-back zones 40 each comprise a narrow circumferential band 72 of bare metal extending proximally from the distal end of the underlying pipe 36, where the inner layer 34 is ground or machined away, which band 72 is disposed on the distal side of an adjoining circumferential band 74 of the inner layer 34. The distal edge of the inner layer 34 between those bands 72, 74 forms a first, shallow step 76 in the cut edge of the parent coating 32. Conversely, the cut distal edge of the outer layer 38 forms a second, radially-larger step 78 in the cut edge of the parent coating 32, disposed proximally with respect to the first step 76.

The tubular body 44 of each support ring 42 has a stepped radially inner face to match the stepped profile in the cut-back zone 40 between the bare metal of the pipe 36 and the inner layer 34 of the parent coating 32. That radially inner face comprises a radially inner portion 80 that is offset longitudinally from a radially outer portion 82 with respect to the central longitudinal axis 48. The radially outer portion 82 is disposed between the radially inner portion 80 and the grounding extension 62 in the longitudinal direction.

Figure 7:
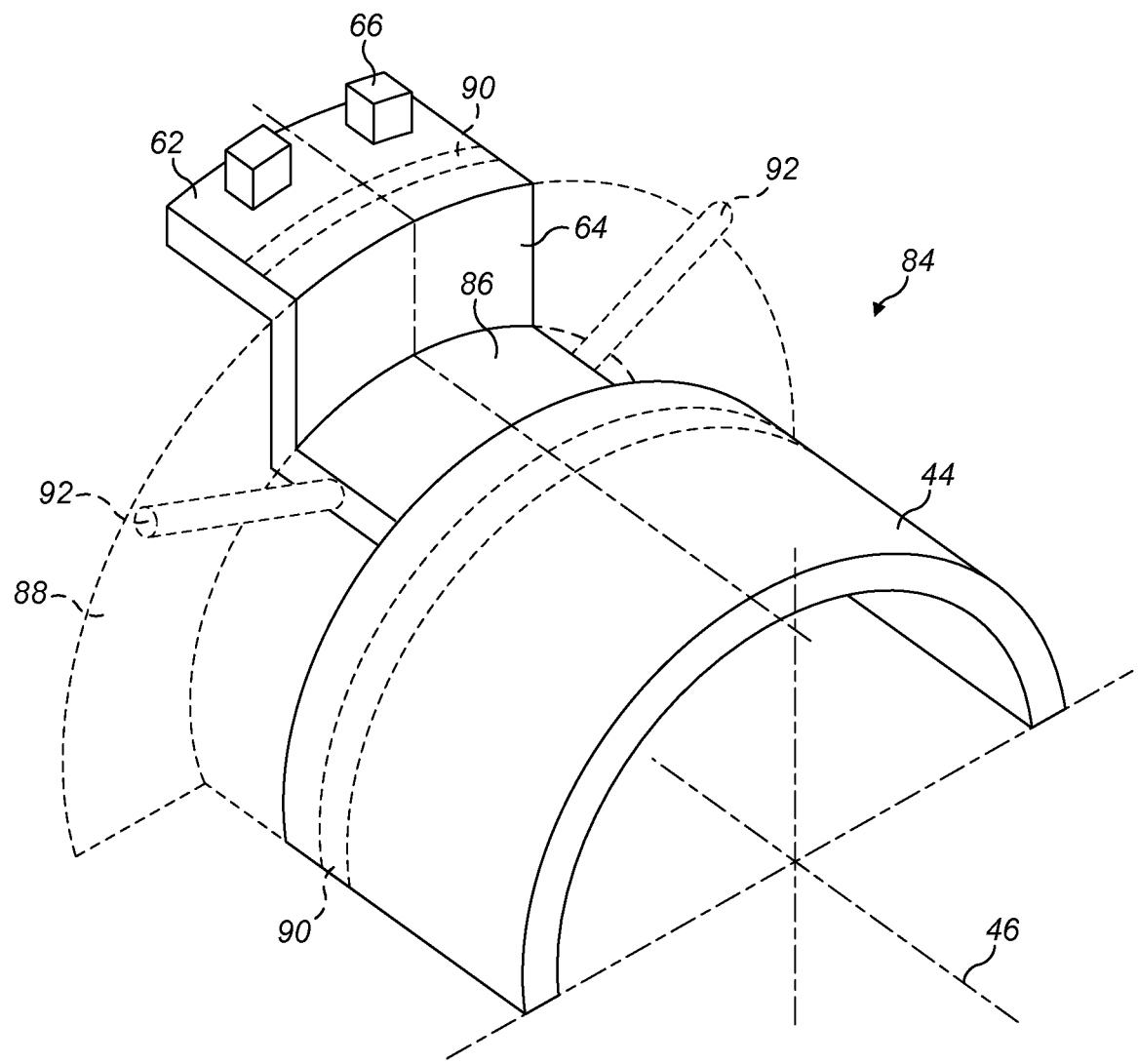
FIG. 7 is a schematic perspective view of a variant of the support ring of the invention.

Turning finally to FIG. 7 of the drawings, this shows a support ring 84 that is a variant of the support ring 42 of FIGS. 2 to 6. The support ring 84 conveniently illustrates optional features of the invention that may be adopted individually or in any combination.

One optional feature shown in FIG. 7 is that the step 64 between the tubular body 44 and the grounding extension 62 is joined to the body 44 indirectly via a longitudinally-extending tab 86. The tab 86 is cantilevered from the body 44 and lies on the same radius as the body 44 with respect to the longitudinal axis 46.

Another optional feature shown in FIG. 7 is that the support ring 84 comprises or supports a shield 88 providing a thermal screen to protect the underlying pipe joint 12 from radiant heat or spattering from the welding process. Any spatters adhering to the pipe joint 12 would otherwise need to be removed after weld completion and before NDT.

Conveniently, the shield 88 may be provided on, or supported by, the step 64 between the tubular body 44 and the grounding extension 62. In this example, the shield 88 extends around a similar arc to a half-ring of the body 44 so as to form a full circumferential screen when two half-rings are brought together around a pipe joint 12.

FIG. 7 also shows that any part of the support ring 84 may include provisions for cooling, such as the tubular body 44, the grounding extension 62 or a shield 88. Such provisions may comprise water channels 90 for water cooling.

Another optional feature shown in FIG. 7 is a pair of thermally-insulating handles 92 extending laterally from the support ring 84 so that welding operatives can remove the support ring 84 after welding as quickly as possible. The welding operatives will wear safety gloves but the temperature of the support ring 84 may be high. The tab 86 provides a convenient location for one or more handles 92 as shown.

However, any location that does not block the welding equipment and hence is away from the tubular body 44 could be used for the or each handle 92, such as on the grounding extension 62, on the step 64 or on the thermal shield 88.

The invention claimed is:

1. A combination of a pipe section having a parent coating, and a support ring fitted to the pipe section for supporting a welding ring to encircle the pipe section, the support ring having:
    a tubular body with substantially circular curvature around a longitudinal axis of the pipe section to support the welding ring, wherein the tubular body encircles a cut-back end zone where the parent coating of the pipe section has been cut back; and
    at least one grounding extension connected to the tubular body;
    wherein the grounding extension is offset longitudinally with respect to the tubular body and with respect to the cut-back end zone of the pipe section, wherein the tubular body is positioned between the grounding extension and a joint to be welded;
    wherein the grounding extension is offset radially outwardly with respect to the tubular body and relative to the longitudinal axis of the pipe section; and
    wherein the grounding extension has ground connector provisions to which one or more earthing wires can be attached.

2. The combination of claim 1, comprising a step extending in a radially-outward direction between the tubular body and the grounding extension to connect the grounding extension to the tubular body and to effect the radial offset of the grounding extension with respect to the tubular body.

3. The combination of claim 2, wherein the step is joined directly to the tubular body, or wherein the step is joined to the tubular body via a longitudinally-extending tab.

4. The combination of claim 3, wherein when the step is joined directly to the tubular body, the step is joined to the tubular body at a longitudinal edge of the tubular body.

5. The combination of claim 2, wherein the step is joined to a longitudinal edge of the grounding extension.

6. The combination of claim 1, wherein the grounding extension is cantilevered from the tubular body to extend longitudinally from the tubular body.

7. The combination of claim 1, wherein the tubular body is rigidly connected to the or cach grounding extension.

8. The combination of claim 1, wherein the tubular body comprises at least two part-tubular part-rings each of substantially part-circular section to complete a substantially circular ring when brought together.

9. The combination of claim 1, further comprising welding rings integrated with or removably attachable to the tubular body.

10. The combination of claim 1, wherein the tubular body has a stepped radially inner face, that face comprising a radially inner portion longitudinally offset from a radially outer portion with respect to the longitudinal axis.

11. The combination of claim 10, wherein the radially outer portion is disposed between the radially inner portion and the grounding extension in the longitudinal direction.

12. The combination of claim 1 wherein:
    the radial offset of the grounding extension away from the tubular body exceeds a maximum thickness of the parent coating of the pipe section and the grounding extension lies radially outboard of the parent coating of the pipe section.

13. The combination of claim 12, further comprising a welding ring supported by and encircling the tubular body to provide a circumferentially-extending track for one or more welding bugs.

14. The combination of claim 12, wherein two pipe sections disposed end-to-end are each fitted with a respective support ring, the grounding extension of each support ring being connected to at least one grounding wire.

\* \* \* \* \*